(12) United States Patent
Fan

(10) Patent No.: US 11,990,981 B2
(45) Date of Patent: May 21, 2024

(54) CELL SELECTION METHOD AND DEVICE

(71) Applicant: DATANG MOBILE COMMUNICATIONS EQUIPMENT CO., LTD., Beijing (CN)

(72) Inventor: Jiangsheng Fan, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 333 days.

(21) Appl. No.: 17/438,945

(22) PCT Filed: Mar. 13, 2020

(86) PCT No.: PCT/CN2020/079366
§ 371 (c)(1),
(2) Date: Sep. 14, 2021

(87) PCT Pub. No.: WO2020/192454
PCT Pub. Date: Oct. 1, 2020

(65) Prior Publication Data
US 2022/0158723 A1    May 19, 2022

(30) Foreign Application Priority Data
Mar. 28, 2019  (CN) .......................... 201910245590.7

(51) Int. Cl.
*H04W 36/30* (2009.01)
*H04B 7/185* (2006.01)
(Continued)

(52) U.S. Cl.
CPC .... *H04B 7/18541* (2013.01); *H04W 36/0094* (2013.01); *H04W 36/30* (2013.01); *H04W 48/20* (2013.01)

(58) Field of Classification Search
CPC ........... H04B 7/18513; H04B 7/18541; H04W 36/0094; H04W 36/24; H04W 36/30;
(Continued)

(56) References Cited

U.S. PATENT DOCUMENTS 5,852,630 A * 12/1998 Langberg ............ H04L 27/2647
375/219
6,512,920 B1 * 1/2003 Yaoya ................ H04B 7/18541
455/427
(Continued)

FOREIGN PATENT DOCUMENTS

| CN | 104168614 A | 11/2014 |
|---|---|---|
| CN | 107040303 A | 8/2017 |

(Continued)

OTHER PUBLICATIONS

Priscoli Delli Francesco, "Architecture of on Integrated GSM-Satellite System", European Transactions on Telecommunications and Relatedtechnologies, AEI, Milano, IT, vol. 5, No. 5, Sep. 1, 1994, pp. 91-99.
(Continued)

*Primary Examiner* — Siu M Lee
(74) *Attorney, Agent, or Firm* — Kilpatrick Townsend & Stockton LLP

(57) ABSTRACT

A cell selection method and a device for reducing resource waste are disclosed. The cell selection method includes: a terminal device determining a candidate measurement channel according to geographical location information, satellite orbit information of one or more satellites in a service area where the terminal device is located, and a correspondence between the satellite orbit information and satellite frequency bands used by the one or more satellites, the geographical location information is for indicating geographical location coordinates where the terminal device is currently located, and the satellite orbit information includes orbital (Continued)

data information and/or identification information of the one or more satellites; performing a cell measurement on the candidate measurement frequencies to obtain measurement results; and selecting or re-selecting a target cell which meets a first preset condition based on a measurement result meeting the first preset condition in the measurement results.

15 Claims, 6 Drawing Sheets

(51) Int. Cl.
*H04W 36/00* (2009.01)
*H04W 48/20* (2009.01)

(58) Field of Classification Search
CPC ..... H04W 36/32; H04W 48/16; H04W 48/20; H04W 84/06; H04W 24/08; Y02D 30/70
See application file for complete search history.

(56) References Cited

U.S. PATENT DOCUMENTS

| | | | |
|---|---|---|---|
| 11,516,715 B2* | 11/2022 | Matsuda | H04W 36/0072 |
| 2010/0035553 A1 | 2/2010 | Shinada et al. | |
| 2010/0234043 A1 | 9/2010 | Wigren et al. | |
| 2011/0143752 A1 | 6/2011 | Hong | |
| 2020/0178137 A1* | 6/2020 | Hassan Hussein | H04B 7/18541 |

FOREIGN PATENT DOCUMENTS

| | | |
|---|---|---|
| CN | 108363077 A | 8/2018 |
| CN | 108601059 A | 9/2018 |

OTHER PUBLICATIONS

ZTE Corporation et al.,"Consideration on the cell definition and NTN mobility", 3GPP TSG-RAN WG2 Meeting#104, Spokane, USA, Nov. 12-16, 2018, total 13 pages, R2-1817062.

TNO et al., "Idle State Mobility Scenarios for Non-Terrestrial Networks", 3GPP TSG-RAN WG3 #101-Bis, Chengdu, China, Oct. 8-12, 2018, total 5 pages, R3-185957.

* cited by examiner

CELL SELECTION METHOD AND DEVICE

The disclosure is a US National Stage of International Application No. PCT/CN2020/079366, filed on Mar. 13, 2020, which claims the priority from Chinese Patent Application No. 201910245590.7, filed with the China National Intellectual Property Administration on Mar. 28, 2019 and entitled "Cell Selection Method and Device", the entire content of which is hereby incorporated by reference.

FIELD

The disclosure relates to the field of satellite communications, and in particular to a cell selection method and device.

BACKGROUND

The satellite communication system uses satellites as relay stations to forward microwave signals and communicates among multiple ground stations. The main purpose of satellite communication is to achieve the "seamless" coverage of the ground.

The most commonly-used satellite communication system now is the synchronous satellite communication system, which uses satellites positioned on the geosynchronous orbit for communication. Generally, three synchronous satellites can basically cover the earth. After a terminal device enters the coverage area of a synchronous satellite, there is no need to consider the cell handover or reselection. However, with the continuous development of satellite communication technology, the number of satellites is increasing, and the orbits used by satellites are becoming more and more diversified. The lower the orbit of the satellite, the faster the satellite moves relative to the ground. In this way, even if the ground terminal does not move, the stationary terminal will face the problem of cell reselection due to the movement of the satellite since the large relative movement occurs between the satellite and the ground. In the low-orbit satellite scenario, due to the high-speed movement of the satellite, the signal quality of the cell where the terminal currently resides will get worse and worse and cannot meet the communication requirement, so the cell reselection is required; or one cell needs to be selected among multiple cells to reside when the terminal device is adjusted from the off state to the on state or cannot find the serving cell.

However, there is no corresponding international standard for cell reselection or cell selection in satellite communication systems.

SUMMARY

The embodiments of the present disclosure provide a cell selection method.

In a first aspect, a cell selection method is provided, which can be executed by a terminal device, where the network device is for example a satellite. The method includes:
determining, by a terminal device, candidate measurement frequencies according to geographical location information, satellite orbit information of one or more satellites in a service area where the terminal device is located, and a correspondence between the satellite orbit information and frequency bands used by the one or more satellites; the geographical location information is for indicating geographical location coordinates where the terminal device is currently located, and the satellite orbit information includes orbital data information and/or identification information of the one or more satellites;
measuring, by the terminal device, the candidate measurement frequencies to obtain measurement results; and
selecting or re-selecting, by the terminal device, a target cell which meets a first preset condition based on a measurement result meeting the first preset condition in the measurement results.

In a possible design, measuring, by the terminal device, the candidate measurement frequencies to obtain measurement results, includes:
performing, by the terminal device, a cell reselection measurement on the candidate measurement frequencies to obtain the measurement results based on that relevant parameters of a cell where the terminal device currently resides or the geographic location coordinates meet a second preset condition.

In a possible design, performing, by the terminal device, the cell reselection measurement at the candidate measurement frequency to obtain the measurement result based on that relevant parameters of the cell where the terminal device currently resides or the geographic location coordinates meet the second preset condition includes, includes:
performing, by the terminal device, the cell reselection measurement on the candidate measurement frequencies to obtain the measurement results when signal quality of the cell where the terminal device currently resides is less than first preset signal quality; or
performing, by the terminal device, the cell reselection measurement on the candidate measurement frequencies to obtain the measurement results when an elevation angle of a beam corresponding to a signal of the cell is less than a preset elevation angle; or
performing, by the terminal device, the cell reselection measurement on the candidate measurement frequencies to obtain the measurement results when a Doppler shift of a beam corresponding to a signal of the cell is greater than a preset frequency shift value; or
performing, by the terminal device, the cell reselection measurement on the candidate measurement frequencies to obtain the measurement results when a vertical distance between the geographic location coordinates and a boundary of a cell corresponding to any one of the candidate measurement frequencies is less than a preset distance;
the first preset signal quality, the preset elevation angle, the preset frequency shift value and/or the preset distance are pre-configured in the terminal device or broadcast by a network device to the terminal device through system information.

In a possible design, re-selecting, by the terminal device, the target cell which meets the first preset condition based on a measurement result meeting the first preset condition in the measurement results, includes:
when a target cell with signal quality greater than second preset signal quality belongs to cells corresponding to the candidate measurement frequencies, re-selecting, by the terminal device, the target cell; or
when a target cell of which signal quality is greater than third preset signal quality belongs to cells corresponding to the candidate measurement frequencies, and a duration for which the signal quality is greater than the third preset signal quality is maintained for a first preset time length, re-selecting, by the terminal device, the target cell; or when signal quality of a cell where the terminal device currently resides is less than fourth preset signal quality and a target cell with signal quality greater than fifth preset signal quality belongs to cells corresponding to the candidate measurement frequencies, re-selecting, by the terminal device, the target cell; or when signal quality of a cell where the terminal device currently resides is less than sixth preset signal quality, a target cell of which signal quality is greater than seventh preset signal quality belongs to cells corresponding to the candidate measurement frequencies, and a duration for which the signal quality of the target cell is greater than the seventh preset signal quality is maintained for a second preset time length, re-selecting, by the terminal device, the target cell; or when there is a target cell having an overlapping coverage area with a cell where the terminal device currently resides among cells corresponding to the candidate measurement frequencies, re-selecting, by the terminal device, the target cell; or when there is a target cell having an overlapping coverage area with a cell where the terminal device currently resides among cells corresponding to the candidate measurement frequencies, signal quality of the target cell is greater than eighth preset signal quality and a duration for which the signal quality of the target cell is greater than the seventh preset signal quality is maintained for a third preset time length, re-selecting, by the terminal device, the target cell; or when a target candidate measurement frequency corresponding to more than one cell belongs to the candidate measurement frequencies, re-selecting, by the terminal device, a target cell with longest service time of the target candidate measurement frequency;

the second preset signal quality, the third preset signal quality, the fourth preset signal quality, the fifth preset signal quality, the sixth preset signal quality, the seventh preset signal quality, the eighth preset signal quality, the first preset time length, the second preset time length and/or the third preset time length are pre-configured in the terminal device or broadcast by a network device to the terminal device through system information.

In a possible design, selecting, by the terminal device, the target cell which meets the first preset condition based on a measurement result meeting the first preset condition in the measurement results, includes:

selecting, by the terminal device, the target cell when there is a target cell with signal quality meeting S criterion among cells corresponding to the candidate measurement frequencies.

In a possible design, measuring, by the terminal device, the candidate measurement frequencies to obtain the measurement results, includes:

measuring, by the terminal device, the candidate measurement frequencies continuously to obtain the measurement results; or measuring, by the terminal device, the candidate measurement frequencies in a preset period to obtain the measurement results;

the preset period is pre-configured in the terminal device or broadcast by a network device to the terminal device through system information.

In a second aspect, the present disclosure provides a cell selection method, including:

configuring, by a network device, a first preset condition for a terminal device;

sending, by the network device, the first preset condition to the terminal device, so that the terminal device measures candidate measurement frequencies to obtain measurement results after determining the candidate measurement frequencies according to geographical location information, satellite orbit information of one or more satellites in a service area where the terminal device is located, and a correspondence between the satellite orbit information and frequency bands used by the one or more satellites, and selects or re-selects a target cell which meets the first preset condition based on a measurement result meeting the first preset condition in the measurement results;

the geographical location information is for indicating geographical location coordinates where the terminal device is currently located, and the satellite orbit information includes orbital data information and/or identification information of the one or more satellites.

In a possible design, the first preset condition is the preset signal quality, a preset elevation angle, a preset frequency shift value, or a preset distance.

In a third aspect, the present disclosure provides a terminal device, including:

a memory configured to store instructions;

a processor configured to read the instructions stored in the memory to perform the process of:

determining candidate measurement frequencies according to geographical location information, satellite orbit information of one or more satellites in a service area where the terminal device is located, and a correspondence between the satellite orbit information and frequency bands used by the one or more satellites; the geographical location information is for indicating geographical location coordinates where the terminal device is currently located, and the satellite orbit information includes orbital data information and/or identification information of the one or more satellites;

measuring the candidate measurement frequencies to obtain measurement results; and controlling the terminal device to select or re-select a target cell which meets a first preset condition based on a measurement result meeting the first preset condition in the measurement results.

In a possible design, when measuring the candidate measurement frequencies to obtain the measurement results, the processor is configured to:

perform a cell reselection measurement on the candidate measurement frequencies to obtain the measurement results based on relevant parameters of a cell where the terminal device currently resides or the geographic location coordinates meet a second preset condition.

In a possible design, when performing the cell reselection measurement on the candidate measurement frequencies to obtain the measurement results based on relevant parameters of the cell where the terminal device currently resides or the geographic location coordinates meet the second preset condition, the processor is configured to:

perform the cell reselection measurement on the candidate measurement frequencies to obtain the measurement results when signal quality of the cell where the terminal device currently resides is less than first preset signal quality; or perform the cell reselection measurement on the candidate measurement frequencies to obtain the measurement results when an elevation angle of a beam corresponding to a signal of the cell is less than a preset elevation angle; or perform the cell reselection measurement on the candidate measurement frequencies to obtain the measurement results when a Doppler shift of a beam corresponding to a signal of the cell is greater than a preset frequency shift value; or perform the cell reselection measurement on the candidate measurement frequencies to obtain the measurement results when a vertical distance between the geographic location coordinates and a boundary of a cell corresponding to any one of the candidate measurement frequencies is less than a preset distance;

the first preset signal quality, the preset elevation angle, the preset frequency shift value and/or the preset distance are pre-configured in the terminal device or broadcast by a network device to the terminal device through system information.

In a possible design, when controlling the terminal device to re-select a target cell which meets a first preset condition based on a measurement result meeting the first preset condition in the measurement results, the processor is configured to:

when a target cell with signal quality greater than second preset signal quality belongs to cells corresponding to the candidate measurement frequencies, control the terminal device to re-select the target cell; or when a target cell of which signal quality is greater than third preset signal quality belongs to cells corresponding to the candidate measurement frequencies, and a duration for which the signal quality of the target cell is greater than the third preset signal quality is maintained for a first preset time length, control the terminal device to re-select the target cell; or when signal quality of a cell where the terminal device currently resides is less than fourth preset signal quality and a target cell with signal quality greater than fifth preset signal quality belongs to cells corresponding to the candidate measurement frequencies, control the terminal device to re-select the target cell; or when signal quality of a cell where the terminal device currently resides is less than sixth preset signal quality and there is a target cell of which signal quality is greater than seventh preset signal quality belongs to cells corresponding to the candidate measurement frequencies, and a duration for which the signal quality of the target cell is greater than the seventh preset signal quality is maintained for a second preset time length, control the terminal device to re-select the target cell; or when there is a target cell having an overlapping coverage area with a cell where the terminal device currently resides among cells corresponding to the candidate measurement frequencies, control the terminal device to re-select the target cell; or when there is a target cell having an overlapping coverage area with a cell where the terminal device currently resides among cells corresponding to the candidate measurement frequencies, signal quality of the target cell is greater than eighth preset signal quality and a duration for which the signal quality of the target cell is greater than the seventh preset signal quality is maintained for a third preset time length, control the terminal device to re-select the target cell; or when a target candidate measurement frequency point corresponding to more than one cell belongs to the candidate measurement frequencies, control the terminal device to re-select a target cell with longest service time of the target candidate measurement frequency point;

the second preset signal quality, the third preset signal quality, the fourth preset signal quality, the fifth preset signal quality, the sixth preset signal quality, the seventh preset signal quality, the eighth preset signal quality, the first preset time length, the second preset time length and/or the third preset time length are pre-configured in the terminal device or broadcast by a network device to the terminal device through system information.

In a possible design, when controlling the terminal device to select the target cell which meets a first preset condition based on a measurement result meeting the first preset condition in the measurement results, the processor is configured to:

control the terminal device to select the target cell when a target cell with signal quality meeting S criterion belongs to cells corresponding to the candidate measurement frequencies.

In a possible design, when measuring the candidate measurement frequencies to obtain measurement results, the processor is configured to:

measure the candidate measurement frequencies continuously to obtain the measurement results; or measure the candidate measurement frequencies in a preset period to obtain the measurement results;

the preset period is pre-configured in the terminal device or broadcast by a network device to the terminal device through system information.

In a fourth aspect, the present disclosure provides a network device, including:

a memory configured to store instructions;

a processor configured to read the instructions stored in the memory to perform the process of:

configuring a first preset condition for a terminal device;

sending the first preset condition to the terminal device through a communication interface, so that the terminal device measures candidate measurement frequencies to obtain measurement results after determining the candidate measurement frequencies according to geographical location information, satellite orbit information of one or more satellites in a service area where the terminal device is located, and a correspondence between the satellite orbit information and frequency bands used by the one or more satellites, and selects or re-selects a target cell which meets the first preset condition based on a measurement result meeting the first preset condition in the measurements results;

the geographical location information is for indicating geographical location coordinates where the terminal device is currently located, and the satellite orbit information includes orbital data information and/or identification information of the one or more satellite.

In a possible design, the first preset condition is the preset signal quality, a preset elevation angle, a preset frequency shift value, or a preset distance.

In a fifth aspect, the present disclosure provides a terminal device, including:

a determining device configured to determine candidate measurement frequencies according to geographical location information, satellite orbit information of one or more satellites in a service area where the terminal device is located, and a correspondence between the satellite orbit information and frequency bands used by the one or more satellites; the geographical location information is for indicating geographical location coordinates where the terminal device is currently located, and the satellite orbit information includes orbital data information and/or identification information of the one or more satellites;

an obtaining device configured to measure the candidate measurement frequencies to obtain measurement results; and a selection or reselection device configured to select or re-select a target cell which meets a first preset condition based on a measurement result meeting the first preset condition in the measurement results.

In a possible design, when measuring the candidate measurement frequencies to obtain the measurement results, the obtaining device is configured to:

perform a cell reselection measurement on the candidate measurement frequencies to obtain the measurement results when relevant parameters of a cell where the terminal device currently resides or the geographic location coordinates meet a second preset condition.

In a possible design, when performing a cell reselection measurement on the candidate measurement frequencies to obtain the measurement results based on relevant parameters of a cell where the terminal device currently resides or the geographic location coordinates meet a second preset condition, the obtaining device is configured to:

perform the cell reselection measurement on the candidate measurement frequencies to obtain the measurement results when signal quality of the cell where the terminal device currently resides is less than first preset signal quality; or perform the cell reselection measurement on the candidate measurement frequencies to obtain the measurement results when an elevation angle of a beam corresponding to a signal of the cell is less than a preset elevation angle; or perform the cell reselection measurement on the candidate measurement frequencies to obtain the measurement results when a Doppler shift of a beam corresponding to a signal of the cell is greater than a preset frequency shift value; or perform the cell reselection measurement on the candidate measurement frequencies to obtain the measurement results when a vertical distance between the geographic location coordinates and a boundary of a cell corresponding to any one of the candidate measurement frequencies is less than a preset distance;

the first preset signal quality, the preset elevation angle, the preset frequency shift value and/or the preset distance is/are pre-configured in the terminal device or broadcast by a network device to the terminal device through system information.

In a possible design, when re-selecting a target cell which meets a first preset condition based on a measurement result meeting the first preset condition in the measurement results, the reselection device is configured to:

when a target cell with signal quality greater than second preset signal quality belongs to cells corresponding to the candidate measurement frequencies, control the terminal device to re-select the target cell; or when a target cell of which signal quality is greater than third preset signal quality belongs to cells corresponding to the candidate measurement frequencies, and a duration for which the signal quality of the target cell is greater than the third preset signal quality is maintained for a first preset time length, control the terminal device to re-select the target cell; or when signal quality of a cell where the terminal device currently resides is less than fourth preset signal quality and a target cell with signal quality greater than fifth preset signal quality belongs to cells corresponding to the candidate measurement frequencies, control the terminal device to re-select the target cell; or when signal quality of a cell where the terminal device currently resides is less than sixth preset signal quality and there is a target cell of which signal quality is greater than seventh preset signal quality belongs to cells corresponding to the candidate measurement frequencies, and a duration for which the signal quality of the target cell is greater than the seventh preset signal quality is maintained for a second preset time length, control the terminal device to re-select the target cell; or when there is a target cell having an overlapping coverage area with a cell where the terminal device currently resides among cells corresponding to the candidate measurement frequencies, control the terminal device to re-select the target cell; or when there is a target cell having an overlapping coverage area with a cell where the terminal device currently resides among cells corresponding to the candidate measurement frequencies, signal quality of the target cell is greater than eighth preset signal quality and a duration for which the signal quality of the target cell is greater than the seventh preset signal quality is maintained for a third preset time length, control the terminal device to re-select the target cell; or when a target candidate measurement frequency point corresponding to more than one cell belongs to the candidate measurement frequencies, control the terminal device to re-select a target cell with longest service time of the target candidate measurement frequency point;

the second preset signal quality, the third preset signal quality, the fourth preset signal quality, the fifth preset signal quality, the sixth preset signal quality, the seventh preset signal quality, the eighth preset signal quality, the first preset time length, the second preset time length and/or the third preset time length are pre-configured in the terminal device or broadcast by a network device to the terminal device through system information.

In a possible design, when selecting the target cell which meets the first preset condition based on a measurement result meeting the first preset condition in the measurement results, the selection device is configured to:

select the target cell when there is a target cell with signal quality meeting S criterion among cells corresponding to the candidate measurement frequencies.

In a possible design, when measuring the candidate measurement frequencies to obtain the measurement results, the obtaining device is configured to:

measure the candidate measurement frequencies continuously to obtain the measurement results; or measure the candidate measurement frequencies in a preset period to obtain the measurement results the preset period is pre-configured in the terminal device or broadcast by a network device to the terminal device through system information.

In a sixth aspect, the present disclosure provides a network device, including:

a configuration device configured to configure a first preset condition for a terminal device;

a sending device configured to send the first preset condition to the terminal device, so that the terminal device measures candidate measurement frequencies to obtain measurement results after determining the candidate measurement frequencies according to geographical location information, satellite orbit information of one or more satellites in a service area where the terminal device is located and a correspondence between the satellite orbit information and frequency bands used by the one or more satellites, and selects or re-selects a target cell which meets the first preset condition based on a measurement result meeting the first preset condition in the measurement results; the geographical location information is for indicating geographical location coordinates where the terminal device is currently located, and the satellite orbit information includes orbital data information and/or identification information of the one or more satellites.

In a possible design, the first preset condition is the preset signal quality, a preset elevation angle, a preset frequency shift value, or a preset distance.

In a seventh aspect, the present disclosure provides a computer storage medium, which stores the computer software instructions used to execute the functions of the first aspect and any design of the first aspect or the functions of the second aspect and any design of the second aspect, or includes the programs involved when performing the method of the first aspect or any design of the first aspect or the method of the second aspect or any design of the second aspect.

In an eighth aspect, the present disclosure provides a computer program product that, when invoked and executed by a computer, can cause the computer to perform the method of the first aspect or any design of the first aspect or the method of the second aspect or any design of the second aspect.

BRIEF DESCRIPTION OF THE DRAWINGS

In order to illustrate the embodiments of the disclosure more clearly, the accompanying figures which need to be used in the embodiments of the disclosure will be introduced below briefly.

DETAILED DESCRIPTION OF THE EMBODIMENTS

Figure 1:
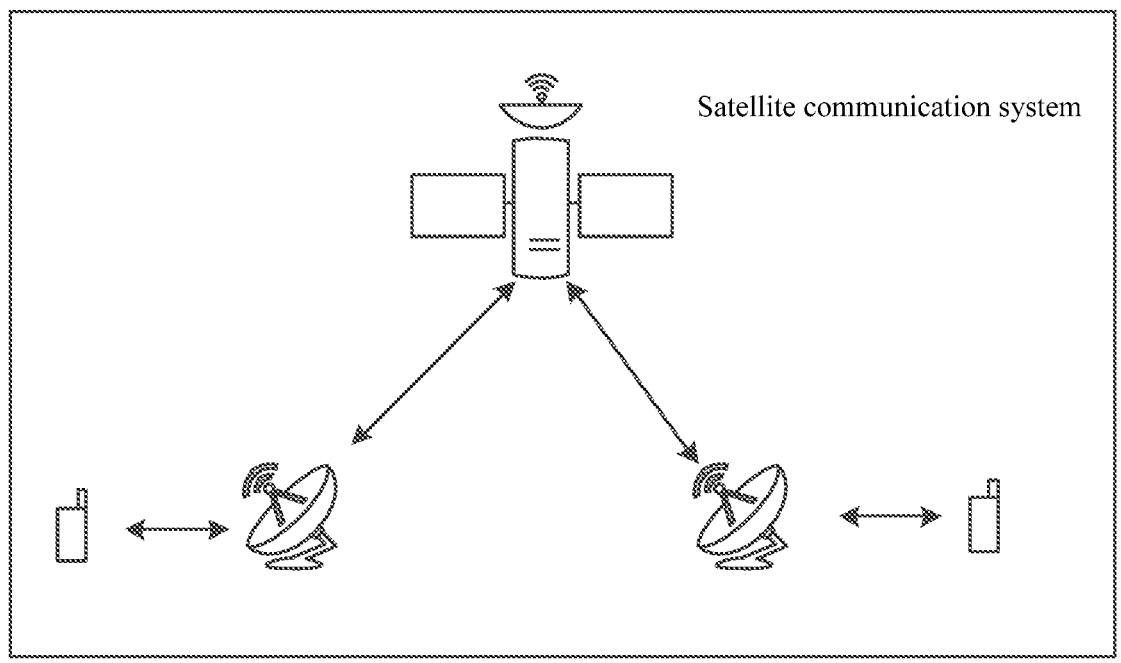
FIG. 1 is a schematic diagram of an application scenario provided by an embodiment of the disclosure.

The embodiments of the disclosure will be described clearly and completely below in combination with the accompanying drawings in the embodiments of the disclosure.

Embodiments of the disclosure can be applied to various communication systems, for example, Global System of Mobile communication (GSM) system, Code Division Multiple Access (CDMA) system, Wideband Code Division Multiple Access (WCDMA) system, General Packet Radio Service (GPRS), Long Term Evolution (LTE) system, Advanced Long Term Evolution (LTE-A) system, Universal Mobile Telecommunication System (UMTS), New Radio (NR) and the like.

It should be further understood that the User Equipment (UE) in the embodiments of the disclosure includes but not limited to a Mobile Station (MS), a mobile terminal, a mobile telephone, a handset, a portable equipment or the like in the embodiments of the disclosure. This user equipment may communicate with one or more core networks via the Radio Access Network (RAN), for example, the user equipment may be a mobile telephone (or called "cellular" telephone), a computer with the wireless communication function, or the like. The user equipment may also be a portable, pocket, handheld, computer built-in or vehicle-carried mobile device.

In the embodiments of the disclosure, the base station (e.g., access point) may mean the device in the access network communicating with the wireless terminal via one or more sectors over the air interface. The base station may be used to perform the inter-conversion between the received air frame and the IP packet, and used as the router between the wireless terminal and the rest of the access network, and the rest of the access network may include Internet Protocol (IP) networks. The base station may further coordinate the attribute management of the air interface. For example, the base station may be the Base Transceiver Station (BTS) in the GSM or CDMA, or may be the NodeB in the TD-SCDMA or WCDMA, or may be the evolutional Node B (eNodeB or eNB or e-NodeB) in the LTE, or may be the gNB in the 5G NR, which is not limited in the disclosure.

In the following, some terms in the embodiments of the disclosure are explained to facilitate the understanding of those skilled in the art.

(1) Network device, including for example a satellites, which may be a communication satellite, military satellite, navigation satellite, etc.

(2) Terminal device, including a device for providing the voice and/or data connectivity to users, for example, which may include a handheld device with the wireless connection function, or a processing device connected to a wireless modem. The terminal device can communicate with satellites via ground stations. The terminal device may also be a transportation media, for example, which may include an automobile, an airplane, a ship, etc. with the satellite communication function.

(3) Cell selection: when a terminal device is turned on or enters the coverage area from the blind area, the terminal device searches all the frequency points allowed by the satellite communication system to obtain a target frequency point, or determines the candidate measurement frequencies and selects a suitable cell to reside according to the geographical location information of the terminal, the satellite orbit information, and the correspondence between the satellite orbit information and frequency bands used by satellites.

(4) Cell reselection: a process in which a terminal device selects the best cell to provide service signals by detecting the signal quality of the neighboring cells and the currently resident cell in the idle mode or in the inactive mode.

(5) The terms "system" and "network" in the embodiments of the disclosure can be used interchangeably. "Multiple" refers to two or more than two. In view of this, "multiple" may also be understood as "at least two" in the embodiments of the disclosure. "And/or" describes the association relationship of the associated objects, and indicates that there may be three relationships, for example, A and/or B may represent: only A, both A and B, and only B. Furthermore, the character "/" generally indicates that the associated objects have a kind of "or" relationship, unless otherwise specified.

In the embodiment of the disclosure, the candidate measurement frequencies are determined in combination with the geographic location information, the satellite orbit information of one or more satellites in a service area where the terminal device is located and the correspondence between the satellite orbit information and frequency bands used by the one or more satellites, and then the candidate measurement frequencies are measured to obtain the measurement results, and finally the target cell is re-selected or selected according to the measurement results which is meet the first preset condition among the measurement results, to apply a cell reselection or selection method process that can be applicable to the satellite communication system.

Moreover, in the embodiments of the disclosure, the candidate measurement frequencies are determined according to the geographic location information, the satellite orbit information and the correspondence between the satellite orbit information and frequency bands used by the one or more satellites, that is, the one or more satellite that can serve the terminal device is determined, avoiding a waste of resources due to the invalid measurement or frequent measurement performed by the terminal device.

Referring to FIG. 1, it is an application scenario of the embodiments of the disclosure. FIG. 1 includes three parts: a satellite, a ground station, and a terminal device. The satellite acts as a relay station in the air, that is, amplify the electromagnetic wave sent from a ground station and then send it back to another ground station. The ground station is the interface between the satellite system and the ground public network, and the terminal device can also enter or exit the satellite system through the ground station to form a link to communicate with the satellite.

The embodiments of the disclosure will be introduced with reference to the accompanying drawings. In the following introduction process, the embodiments provided by the disclosure is applied in the application scenario shown in FIG. 1 as an example, and the network device is a satellite as an example.

Figure 2:
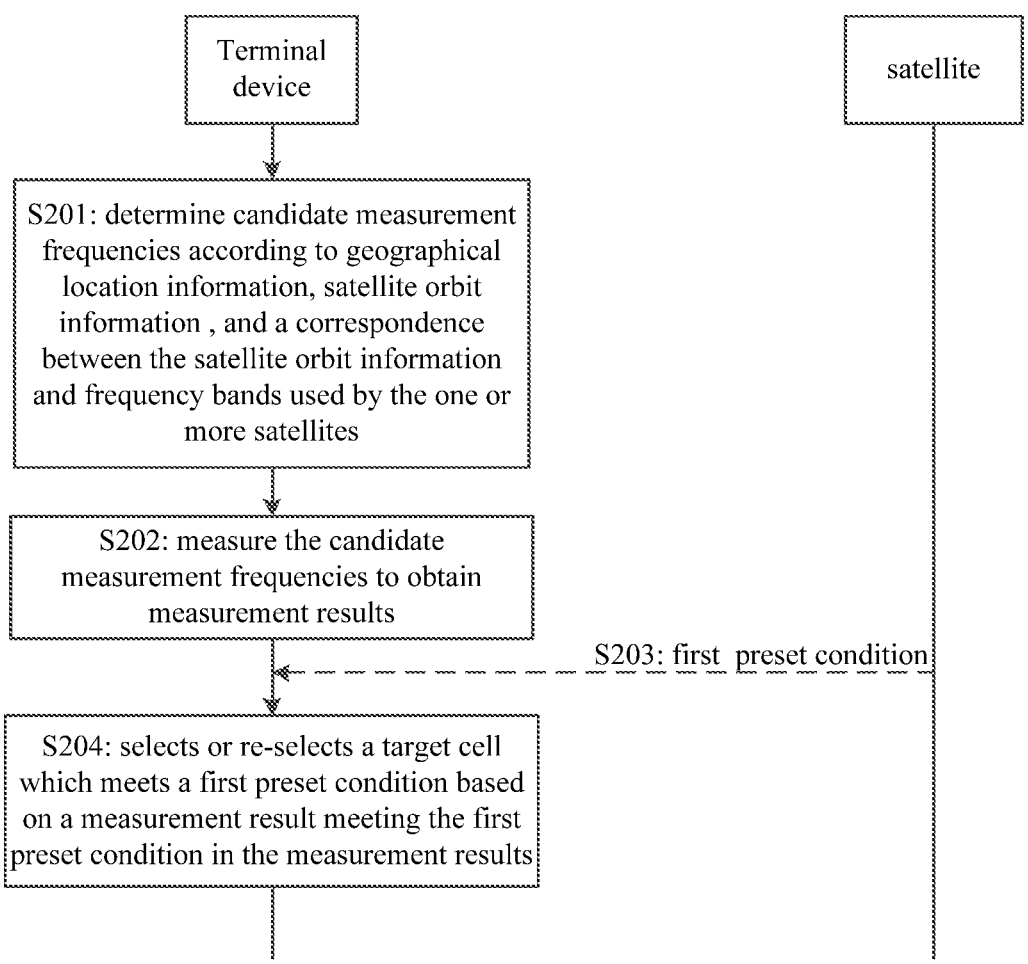
FIG. 2 is a schematic flowchart of a cell selection method provided by an embodiment of the disclosure.

Referring to FIG. 2, the embodiments of the disclosure provides a cell selection method, and the process of the method is roughly described as follows.

S201: the terminal device determines candidate measurement frequencies according to geographical location information, satellite orbit information of one or more satellites in a service area where the terminal device is located, and a correspondence between the satellite orbit information and frequency bands used by the one or more satellites; the geographical location information is for indicating geographical location coordinates where the terminal device is currently located, and the satellite orbit information includes orbital data information and/or identification information of the one or more satellites.

In an embodiment of the disclosure, the geographic location information may be a longitude information and a latitude information of the current location of the terminal device currently located, or the city where the terminal device is currently located, or other information that can be used to indicate the geographic location coordinates where the terminal device is currently located.

The satellite orbit information includes the orbital data information and/or identification information of the one or more satellites in the service area where the terminal device is located, and the orbital data information of the one or more satellite may be the places on the earth that the satellite will bypass when running around the earth and when to bypass the places. For example, the Satellite 1 passes through Beijing at 16:00 of Beijing time, Shanghai at 17:00, Anhui at 20:00, Chongqing at 21:00, etc.; the Satellite 2 passes through Shanghai at 16:00, Nanjing at 17:00 and Hangzhou at 21:00; the Satellite 3 passes through Beijing at 16:00, Shenyang at 17:00 and Lianyungang at 20:00; and the Satellite 4 passes through Xi'an at 16:00, Gansu at 17:00 and Chengdu at 21:00. Referring to Table 1 below for details. The satellite identification information is used to identify satellites. Each satellite has a unique identifier, and the identifier is numbers, characters, or a combination of numbers and characters, which is not limited here.

TABLE 1

| Satellite | Orbital data information | Identification information |
|---|---|---|
| Satellite 1 | Beijing, Shanghai, Anhui, Chongqing | 1 |
| Satellite 2 | Shanghai, Nanjing, Hangzhou | 2 |
| Satellite 3 | Beijing, Shenyang, Lianyungang | 3 |
| Satellite 4 | Xi'an, Gansu, Chengdu | 4 |

The correspondence between the satellite orbit information and frequency bands used by the one or more satellites may be the correspondence between the orbital data information of the one or more satellites and frequency bands used by the one or more satellites, or may be the correspondence between identifiers of the one or more satellites and frequency bands used by satellites, or may be the correspondence among the orbital data information of the one or more satellites, identifiers of the one or more satellites and frequency bands used by the one or more satellites.

TABLE 2

| Orbital data 1 of Satellite 1 | Orbital data 2 of Satellite 2 | Orbital data 3 of Satellite 3 | ... | Orbital data n − 1 of Satellite n − 1 | Orbital data n of Satellite n |
|---|---|---|---|---|---|
| Frequency band $f_1$ used by Satellite 1 | Frequency band $f_2$ used by Satellite 2 | Frequency band $f_3$ used by Satellite 3 | ... | Frequency band $f_{n-1}$ used by Satellite n − 1 | Frequency band $f_n$ used by Satellite n |

TABLE 3

| Identifier 1 of Satellite 1 | Identifier 2 of Satellite 2 | Identifier 3 of Satellite 3 | ... | Identifier n − 1 of Satellite n − 1 | Identifier n of Satellite n |
|---|---|---|---|---|---|
| Frequency band $f_1$ used by Satellite 1 | Frequency band $f_2$ used by Satellite 2 | Frequency band $f_3$ used by Satellite 3 | ... | Frequency band $f_{n-1}$ used by Satellite n − 1 | Frequency band $f_n$ used by Satellite n |

In a specific implementation process, the geographic location information is Beijing and the correspondence between the satellite orbit information and frequency bands used by satellites is the correspondence between the orbital data information of the one or more satellites and frequency bands used by the one or more satellites as an example. It can be determined that the satellites corresponding to the terminal device are satellites 1 and 3 according to the satellite orbit information provided in Table 1, and then the frequency band $f_1$ of the satellite 1 and the frequency band $f_3$ of the satellite 3 are determined according to the correspondence provided in Table 2, and thus the candidate measurement frequencies are determined as $f_1$ and $f_3$.

S202: the terminal device measures the candidate measurement frequencies to obtain measurement results.

In the embodiments of the disclosure, the terminal device can measure the candidate measurement frequencies according to a preset rule to obtain the measurement results, that is, the terminal device can perform a cell measurement on the candidate measurement frequencies. The cell measurement can be a cell reselection measurement or a cell selection measurement. The preset rule may be: the terminal device measures the candidate measurement frequencies continuously after starting to measure the candidate measurement points, or may measure the candidate measurement frequencies at a preset time interval, such as, the preset time interval may be 1 millisecond (ms), 2 ms, or other preset time intervals.

In the embodiments of the disclosure, the preset time interval may be preset in the terminal device or may be broadcast by the network device to the terminal device through the system information.

In the embodiments of the disclosure, when the terminal device performs the initial cell selection and cell reselection, there are differences in the criteria for measuring candidate measurement frequencies, which will be introduced respectively below.

I. Cell Reselection.

In the embodiments of the disclosure, when the signal quality of the cell corresponding to the candidate measurement frequencies meets the S criterion and the reselection decision criterion, the terminal device will access the cell to reside, and the terminal device can perform the cell reselection process after it resides in the appropriate satellite communication system and stays for a period of time. The period of time here may be 1 second (s), 2 s, etc., and will not be listed here.

The reselection process of the terminal device includes two parts: measurement and reselection. The terminal device initiates the corresponding process when the conditions are met according to the relevant parameters configured by the network device. For example, in the embodiments of the disclosure, the terminal device may determine when to perform the cell reselection measurement on the candidate measurement frequencies according to the relevant parameters of a cell where the terminal device currently resides, or may determine when to perform the cell reselection measurement on the candidate measurement frequencies according to the geographic location coordinates, which will be introduced respectively below.

First Example

The relevant parameters of the cell where the terminal device currently resides meet the second preset condition, and the terminal device performs the cell reselection measurement on the candidate measurement frequencies to obtain the measurement results, the relevant parameters of the cell where the terminal device currently resides may be the signal quality of the cell, the elevation angle of the beam of the cell, and the Doppler shift of the beam of the cell.

1. The Relevant Parameter is the Signal Quality of the Cell where the Terminal Device Currently Resides.

In the embodiments of the disclosure, the priorities may be configured for the candidate measurement frequencies, so that the terminal device can reselect to a high-priority cell to reside, different cells with the same carrier frequency have the same priority, and the priority information configured for the candidate measurement frequencies can be sent to the terminal device through the RCC connection release message.

In a specific implementation process, for the candidate measurement frequencies of which the priority are higher than the frequency of the cell where the terminal device currently resides, the terminal device measures the candidate measurement frequencies continuously; and for the candidate measurement frequencies of which the priority are equal to or lower than the frequency of the cell where the terminal device currently resides, the terminal device starts to measure the candidate measurement frequencies when the signal quality of the cell where the terminal device currently resides is less than the first preset signal quality; the measurement here can refer to the intra-frequency measurement or inter-frequency measurement. In the intra-frequency measurement, the first preset threshold may refer to the start threshold (Sintrasearch) of the intra-frequency measurement. In the inter-frequency measurement, the first preset threshold may refer to the start threshold (Snonintrasearch) of the inter-frequency measurement. The signal quality of the cell where the terminal device currently resides may be the S value, that is, Srxlev (S criterion) in the cell selection.

2. The Relevant Parameter is the Elevation Angle of the Beam Corresponding to the Signal of the Cell where the Terminal Device Currently Resides.

The elevation angle of the beam corresponding to the signal of the cell may be the angle between the ground horizontal line of the place where the terminal device is located and the center line of the satellite beam. For example, when the satellite is located directly above the terminal device, the elevation angle of the beam corresponding to the signal of the cell is 90 degrees. In a specific implementation process, when the elevation angle of the beam corresponding to the signal of the cell is less than the preset elevation angle, which means that the current serving satellite is moving away from the terminal device, the terminal device needs to measure the candidate measurement frequencies; and corresponding to the elevation angle of the beam, the Doppler frequency shift of the beam can be used to determine whether to measure the candidate measurement frequencies.

If the Doppler frequency shift of the beam corresponding to the signal of the cell is represented by $f_d$, then $f_d$ can be calculated by the following formula (1):

$$f_d = f/c \times v \times \cos \theta \qquad (1)$$

$\theta$ is the elevation angle of the beam corresponding to the signal of the cell Doppler frequency shift, v is the moving speed of the satellite, c is the propagation speed of electromagnetic waves, and f is the carrier frequency.

Second Example

When the geographic location coordinates meet the second preset condition, the terminal device measures the candidate measurement frequencies to obtain the measurement results.

In the embodiments of the disclosure, the geographic location coordinates meet the second preset condition may be: the vertical distance between the geographic location coordinates and the boundary of the cell corresponding to any one of the candidate measurement frequencies is less than a preset distance. When the vertical distance between the geographic location coordinates and the boundary of the cell corresponding to any one of the candidate measurement frequencies is less than the preset distance, it indicates that the terminal device will move to the boundary of the cell corresponding to any one of the candidate measurement frequencies, and the cell reselection measurement is required at this time.

In the embodiments of the disclosure, the first preset signal quality, preset elevation angle, preset frequency shift value, or preset distance may be pre-configured in the terminal device, or may be configured by the network device for the terminal device and broadcast to the terminal device through the system information.

II. Cell Selection.

In the embodiments of the disclosure, the cell selection can be the initial cell selection. In this case, the terminal device does not store any prior information to help identify the specific frequencies of the satellite communication system, so the terminal device needs to scan all frequencies of the satellite communication system according to its own capability in order to find a suitable cell to reside. The cell selection can also be the cell selection based on the stored information. In this case, the terminal device stores the related information of carrier frequencies, and may also include the parameter information of some cells, for example, obtained from the previously-received measurement control information or the previously resident or detected cell. The terminal device may select a cell with relevant information. Once a suitable cell appears, the terminal device will select and reside in it.

In the embodiments of the disclosure, for the cell selection measurement, the terminal device may perform the cell selection measurement on the candidate measurement frequencies when the terminal device is adjusted from the off state to the on state, or the terminal device may perform the cell selection measurement on the candidate measurement frequencies when returning to the idle state from the Radio Resource Control (RRC) connected state, or the terminal device may perform the cell selection measurement on the candidate measurement frequencies when re-entering the serving cell of the satellite communication system.

S203: a satellite sends a first preset condition to the terminal device, and correspondingly, the terminal device receives the first preset condition sent by the satellite.

It should be noted here that the step S203 is not a mandatory step. In a specific implementation process, the first preset condition may be preset in the terminal device and does not need to be configured and sent by the satellite.

S204: the terminal device selects or re-selects a target cell which meets a first preset condition based on a measurement result meeting the first preset condition in the measurement results.

Figure 3:
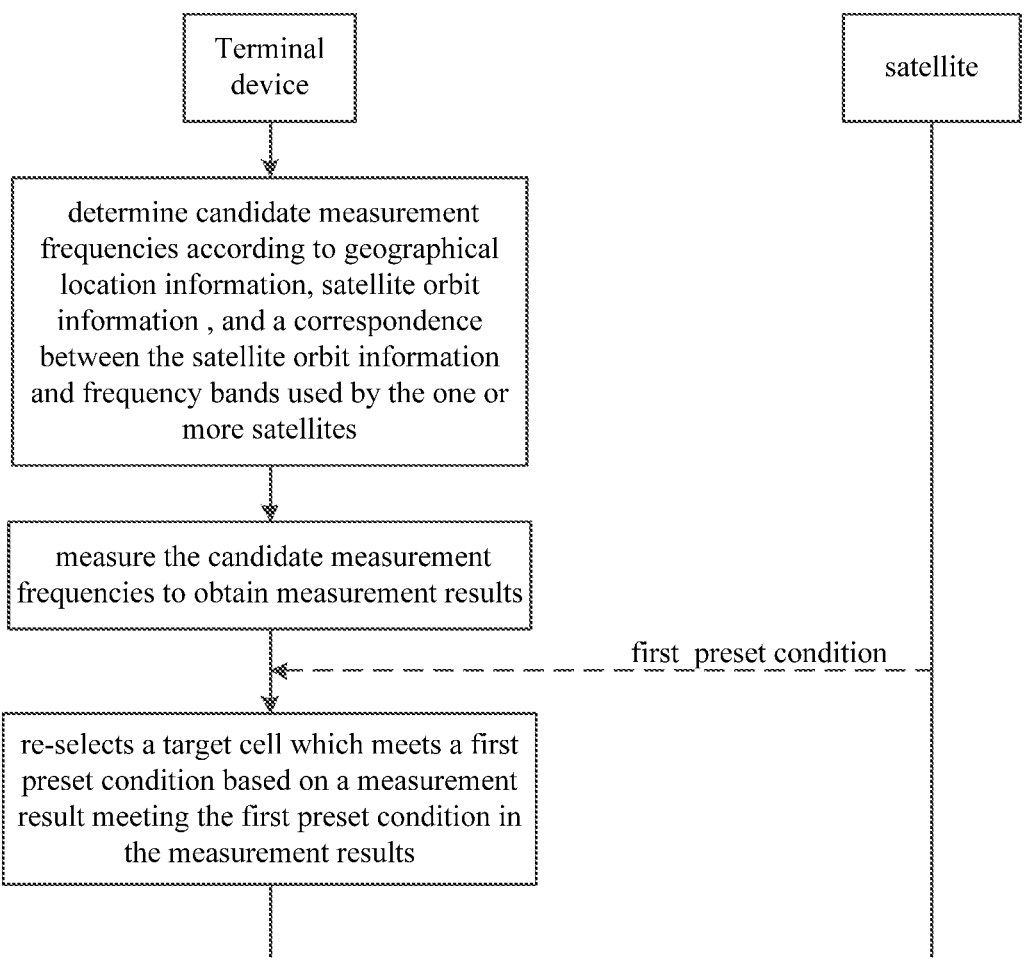
FIG. 3 is a schematic diagram of a cell reselection process provided by an embodiment of the disclosure.
Figure 4:
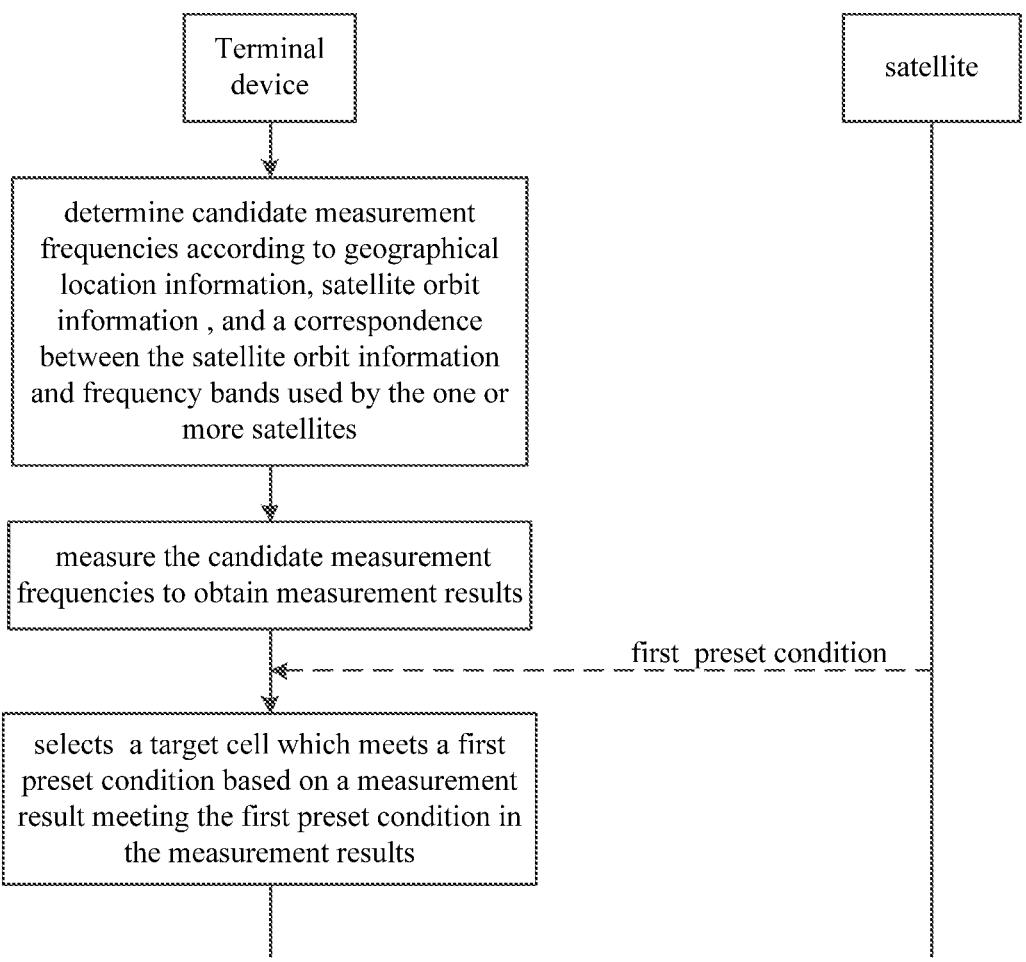
FIG. 4 is a schematic diagram of an initial cell selection process provided by an embodiment of the disclosure.

In the embodiments of the disclosure, the terminal device measures the candidate measurement frequencies, and determines whether the measurement results meet the first preset condition after obtaining the measurement results. When there is a measurement result among the measurements meets the first preset condition, the terminal device selects or re-selects a target cell for meeting the first preset condition. Two cases, i.e., initial cell selection and cell reselection, will be respectively introduced below. In the embodiments of the disclosure, the flowcharts of the cell selection and cell reselection performed by the terminal device can be seen in FIG. 3 and FIG. 4.

1. Cell Reselection.

The step in which the terminal device re-selects a target cell which meets c a first preset condition based on the measurement result meeting the first preset condition in the measurement results includes:

if there is a target cell with signal quality greater than second preset signal quality among cells corresponding to the candidate measurement frequencies, the terminal device re-selects the target cell; or if there is a target cell of which the signal quality is greater than third preset signal quality among cells corresponding to the candidate measurement frequencies and a duration for which the signal quality is greater than the third preset signal quality can be maintained for a first preset time length, the terminal device re-selects the target cell; or if signal quality of the cell where the terminal device currently resides is less than fourth preset signal quality and there is a target cell with signal quality greater than fifth preset signal quality among cells corresponding to the candidate measurement frequencies, the terminal device re-selects the target cell; or if signal quality of the cell where the terminal device currently resides is less than sixth preset signal quality and there is a target cell of which the signal quality is greater than seventh preset signal quality and a duration for which the signal quality of the target cell is greater than the seventh preset signal quality can be maintained for a second preset time length among cells corresponding to the candidate measurement frequencies, the terminal device re-selects the target cell; or if there is a target cell having an overlapping coverage area with the cell where the terminal device currently resides among cells corresponding to the candidate measurement frequencies, the terminal device re-selects the target cell; or if there is a target cell having an overlapping coverage area with the cell where the terminal device currently resides among cells corresponding to the candidate measurement frequencies and signal quality of the target cell is greater than eighth preset signal quality and a duration for which the signal quality of the target cell is greater than the seventh preset signal quality can be maintained for a third preset time length, the terminal device re-selects the target cell; or if there is a target candidate measurement frequency point corresponding to more than one cell among the candidate measurement frequencies, the terminal device re-selects a target cell with the longest service time of the target candidate measurement frequency point;

the second preset signal quality, the third preset signal quality, the fourth preset signal quality, the fifth preset signal quality, the sixth preset signal quality, the seventh preset signal quality, the eighth preset signal quality, the first preset time length, the second preset time length and the third preset time length are pre-configured in the terminal device or broadcast by a network device to the terminal device through system information.

In the embodiments of the disclosure, whether to re-select a target cell may be determined based on the signal quality of the cell where the terminal device currently resides, the signal quality of the cell corresponding to the candidate measurement frequencies, the overlap coverage area of the currently resident cell and the cell corresponding to the candidate measurement frequencies, etc. which will be introduced respectively below.

(1) The cases when the cell reselection decision is made according to the signal quality of the currently resident cell and the signal quality of the cell corresponding to the candidate measurement frequencies are mainly divided into several following categories, which will be introduced below on the basis of the priorities of the candidate measurement frequencies.

1) For the high-priority candidate measurement frequency, when the terminal device measures the candidate measurement frequency and when the signal quality of the cell at the measured candidate measurement frequency is greater than the second preset signal quality, the terminal device re-selects a cell with the signal quality greater than the second preset signal quality; or, when the signal quality of the cell at the measured candidate measurement frequency is greater than the third preset signal quality and a durations for which the signal quality of the cell at the measured candidate measurement frequency that is greater than the third preset signal quality can be maintained for the first preset time length, the terminal device re-selects a cell with the signal quality greater than the third preset signal quality; the second preset signal quality and the third preset signal quality may be the high-priority reselection threshold (ThreshXHigh). In the embodiments of the disclosure, the purpose of setting the first preset time length is to avoid the ping-pong effect.

2) For the low-priority candidate measurement frequency, when the signal quality of the cell where the terminal device currently resides is less than the fourth preset signal quality, when the terminal device measures the candidate measurement frequency and when the signal quality of the cell at the measured candidate measurement frequency is greater than the fifth preset signal quality, the terminal device re-selects a target cell with the signal quality greater than the fifth preset signal quality; or, when the signal quality of the cell a cell where the terminal device currently resides is less than the sixth preset signal quality, when the terminal device measures the candidate measurement frequency, when the signal quality of the cell at the measured candidate measurement frequency is greater than the seventh preset signal quality and when the duration during which the signal quality of the cell at the measured candidate measurement frequency is greater than the seventh preset signal quality exceeds the second preset time length, the terminal device re-selects a cell with the signal quality greater than the seventh preset signal quality, the fourth preset signal quality and the sixth preset signal quality may be the low-priority reselection threshold (ThreshServLow) of service frequency points, and the fifth preset signal quality and the seventh preset signal quality may be the low-priority reselection threshold (ThreshXLow).

3) For the candidate measurement frequencies with the same frequency or same priority, when the signal quality of the cell where the terminal device currently resides is less than the ninth preset signal quality, when the terminal device measures the candidate measurement frequency, when the signal quality of the cell at the measured candidate measurement frequency is greater than the signal quality of the cell and when the duration during which the signal quality of the cell on the measured candidate measurement frequency is greater than the signal quality of the cell exceeds the fourth preset time length, the terminal device re-selects a cell with the signal quality greater than the signal quality of the cell where the terminal device currently resides; the ninth preset signal quality may be Sintrasearch.

(2) The case when the cell reselection decision is made according to the overlapping coverage areas of the cell where the terminal device currently resides and the cell corresponding to the candidate measurement frequencies.

In the embodiments of the disclosure, when there is a target cell having an overlapping coverage with the currently resident cell among the cells corresponding to the candidate measurement frequencies, the terminal device re-selects the target cell; or when there is a target cell having an overlapping coverage with the currently resident cell among the cells corresponding to the candidate measurement frequencies and the signal quality of the target cell is greater than the eighth preset signal quality and a duration for which the signal quality of the target cell is greater than the eighth preset signal quality can be maintained for the third preset time length, the terminal device re-selects the target cell, the purpose of setting the third preset time length is to avoid the ping-pong handover.

(3) In the embodiments of the disclosure, when there is a target candidate measurement frequency point corresponding to multiple cells among the candidate measurement frequencies, the terminal device re-selects a target cell with the longest service time of the target candidate measurement frequency.

In the embodiments of the disclosure, the second preset signal quality, the third preset signal quality, the fourth preset signal quality, the fifth preset signal quality, the sixth preset signal quality, the seventh preset signal quality, the eighth preset signal quality, the first preset time length, the second preset time length and the third preset time length are pre-configured in the terminal device or broadcast by a network device to the terminal device through system information.

2. Cell Selection.

In the embodiments of the disclosure, if there is a target cell with signal quality meeting the S criterion among cells corresponding to the candidate measurement frequencies, the terminal device selects the target cell.

In a specific implementation process, the specific content of the S criterion is as follows:

Srxlev>0 and Squal>0 the meanings of the parameters in the formulas $$Srxlexv = Q_{rxlevmeas} - (Q_{rxlev\ min} + Q_{rxlev\ min\ offset}) - P_{compensation} - Qoffset_{temp} \text{ and}$$

$$Squal = Q_{qualmeas} - (Q_{qual\ min} + Q_{qual\ min\ offset}) - Qoffset_{temp} \text{ are as follows:}$$

| | |
|---|---|
| Srxlev | Cell selection receiving value, unit: decibel (dB) |
| Squal | Cell selection quality value, unit: dB |
| Qoffsettemp | Temporary offset, unit: dB |
| $Q_{rxlevmeas}$ | RSRP value of measured cell |
| $Q_{qualmeas}$ | RSRQ value of measured cell |
| $Q_{rlev\,min}$ | Minimum receiving strength requirement of RSRP in cell, unit: dBm |
| $Q_{qual\,min}$ | Minimum receiving strength requirement of RSRQ in cell, unit: dB |
| $Q_{rxlev\,min\,offset}$ | Offset value of the signal Qrxlevmin in order to prevent ping-pong when staying on the VPLMN to periodically search for the high-priority PLMN and when Srxlev is used to evaluate the cell quality |
| $Q_{qual\,min\,offset}$ | Offset value of the signal Qqualmin in order to prevent ping-pong when staying on the VPLMN to periodically search for the high-priority PLMN and when Squal is used to evaluate the cell quality |
| $P_{compensation}$ | Unit: dB |
| PEMAX1 | Maximum uplink transmit power allowed by the terminal in cell, unit: dBm |
| PEMAX2 | PEMAX1 and PEMAX2 are obtained from p-Max and NS-PmaxList in the broadcast message respectively |
| PPowerClass | Maximum uplink transmit power determined by terminal power level capability, unit: dBm |

When selecting a cell, the terminal obtains the values of Qrxlevmeas and Qqualmeas of the cell through measurement, obtains other parameters in the S criterion formula through the system information of the cell and its own capability level, calculates Srxlev and Squal, and compares them with 0. If Srxlev>0 and Squal>0, the terminal considers that the cell meets the signal quality requirement for cell selection and can select it as the resident cell. If the system information of the cell broadcasts that it is allowed to reside, the terminal will choose to reside on this cell.

The devices provided by the embodiments of the disclosure will be introduced below with reference to the accompanying drawings.

Figure 5:
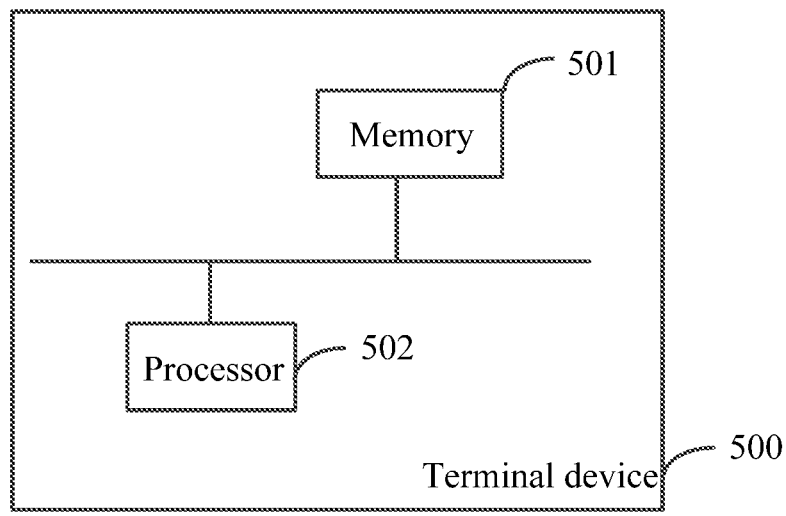
FIG. 5 is a structural schematic diagram of a terminal device provided by an embodiment of the disclosure.

Referring to FIG. 5, a terminal device 500 provided in an embodiment of the disclosure includes:

a memory 501 configured to store instructions;

a processor 502 configured to read the instructions stored in the memory to perform the process of:

determining candidate measurement frequencies according to the geographical location information, the satellite orbit information of one or more satellites in a service area where the terminal device is located, and a correspondence between the satellite orbit information and frequency bands used by the one or more satellites; the geographical location information is for indicating the geographical location coordinates where the terminal device is currently located, and the satellite orbit information includes the orbital data information and/or identification information of the one or more satellite;

measuring the candidate measurement frequencies to obtain the measurement results;

controlling the terminal device to select or re-select a target cell which meets a first preset condition if there is a measurement result meeting the first preset condition in the measurement results.

In the embodiments of the disclosure, the processor 502 may be a Central Processing Unit (CPU) or an Application-Specific Integrated Circuit (ASIC), or may be one or more integrated circuits for controlling the program execution, or may be a baseband chip, etc. There may be one or more memories 501, and the memory may be a Read Only Memory (ROM), a Random Access Memory (RAM) or a magnetic disk memory, etc.

In a possible design, when measuring the candidate measurement frequencies to obtain measurement results, the processor 502 is configured to:

perform a cell reselection measurement on the candidate measurement frequencies to obtain the measurement results if relevant parameters of a cell where the terminal device currently resides or the geographic location coordinates meet a second preset condition.

In a possible design, when performing a cell reselection measurement on the candidate measurement frequencies to obtain the measurement results if relevant parameters of a cell where the terminal device currently resides or the geographic location coordinates meet a second preset condition, the processor 502 is configured to:

perform a cell reselection measurement on the candidate measurement frequencies to obtain the measurement results if the signal quality of the currently resident cell is less than the first preset signal quality; or perform a cell reselection measurement on the candidate measurement frequencies to obtain the measurement results if an elevation angle of a beam corresponding to a signal of the currently resident cell is less than a preset elevation angle; or perform a cell reselection measurement on the candidate measurement frequencies to obtain the measurement results if a Doppler frequency shift value of a beam corresponding to a signal of the currently resident cell is greater than a preset frequency shift value; or perform a cell reselection measurement on the candidate measurement frequencies to obtain the measurement results if a vertical distance between the geographic location coordinates and a boundary of a cell corresponding to any one of the candidate measurement frequencies is less than a preset distance;

the first preset signal quality, the preset elevation angle, the preset frequency shift value and/or the preset distance is/are pre-configured in the terminal device or broadcast by a network device to the terminal device through the system information.

In a possible design, when controlling the terminal device to re-select a target cell which meets a first preset condition based on a measurement result meeting the first preset condition in the measurement results, the processor 502 is configured to:

when a target cell with signal quality greater than second preset signal quality belongs to cells corresponding to the candidate measurement frequencies, control the terminal device to re-select the target cell; or when a target cell of which signal quality is greater than third preset signal quality belongs to cells corresponding to the candidate measurement frequencies, and a duration for which the signal quality of the target cell is greater than the third preset signal quality is maintained for a first preset time length, control the terminal device to re-select the target cell; or when signal quality of a cell where the terminal device currently resides is less than fourth preset signal quality and a target cell with signal quality greater than fifth preset signal quality belongs to cells corresponding to the candidate measurement frequencies, control the terminal device to re-select the target cell; or when signal quality of a cell where the terminal device currently resides is less than sixth preset signal quality and there is a target cell of which signal quality is greater than seventh preset signal quality belongs to cells corresponding to the candidate measurement frequencies, and a duration for which the signal quality of the target cell is greater than the seventh preset signal quality is maintained for a second preset time length, control the terminal device to re-select the target cell; or when there is a target cell having an overlapping coverage area with a cell where the terminal device currently resides among cells corresponding to the candidate measurement frequencies, control the terminal device to re-select the target cell; or when there is a target cell having an overlapping coverage area with a cell where the terminal device currently resides among cells corresponding to the candidate measurement frequencies, signal quality of the target cell is greater than eighth preset signal quality and a duration for which the signal quality of the target cell is greater than the seventh preset signal quality is maintained for a third preset time length, control the terminal device to re-select the target cell; or when a target candidate measurement frequency point corresponding to more than one cell belongs to the candidate measurement frequencies, control the terminal device to re-select a target cell with longest service time of the target candidate measurement frequency point;

the second preset signal quality, the third preset signal quality, the fourth preset signal quality, the fifth preset signal quality, the sixth preset signal quality, the seventh preset signal quality, the eighth preset signal quality, the first preset time length, the second preset time length and/or the third preset time length are pre-configured in the terminal device or broadcast by a network device to the terminal device through system information.

In a possible design, when controlling the terminal device to select a target cell which meets a first preset condition based on a measurement result meeting the first preset condition in the measurement results, the processor 502 is configured to:

when there is a target cell with signal quality meeting the S criterion among cells corresponding to the candidate measurement frequencies, control the terminal device to select the target cell.

In a possible design, when measuring the candidate measurement frequencies to obtain the measurement results, the processor 502 is configured to:

measure the candidate measurement frequencies continuously to obtain the measurement results; or measure the candidate measurement frequencies in a preset period to obtain the measurement results;

the preset period is pre-configured in the terminal device or broadcast by a network device to the terminal device through the system information.

Figure 6:
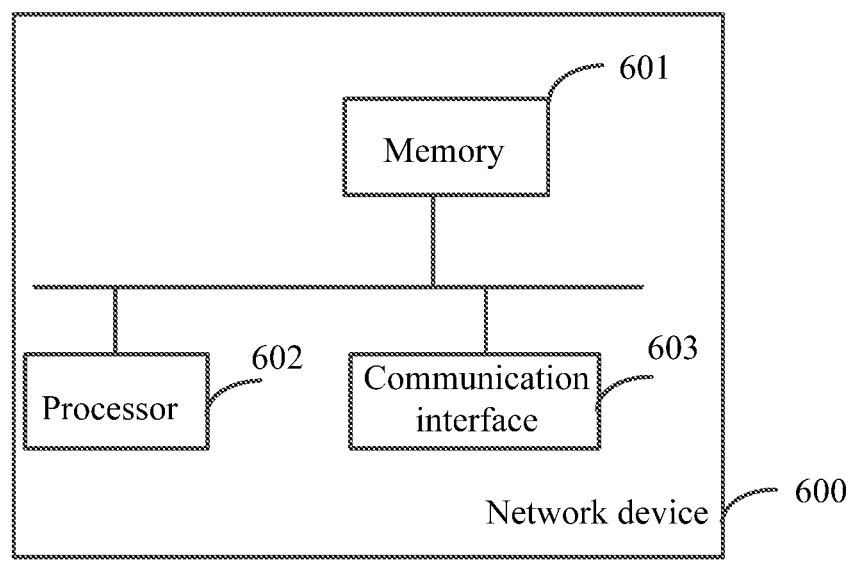
FIG. 6 is a structural schematic diagram of a network device provided by an embodiment of the disclosure.

Referring to FIG. 6, a network device 600 provided by the embodiment of the disclosure includes:

a memory 601 configured to store instructions;

a processor 602 configured to read the instructions stored in the memory to perform the process of:

configuring a first preset condition for a terminal device;

sending the first preset condition to the terminal device through a communication interface 603, so that the terminal device measures candidate measurement frequencies to obtain the measurement results after determining the candidate measurement frequencies according to the geographical location information, the satellite orbit information of one or more satellites in a service are where the terminal device is located and a correspondence between the satellite orbit information and frequency bands used by one or more satellites, and selects or re-selects a target cell which meets the first preset condition based on a measurement result meeting the first preset condition in the measurements results; the geographical location information is used to indicate the geographical location coordinates where the terminal device is currently located, and the satellite orbit information includes the orbital data information and/or identification information of the one or more satellite.

In the embodiments of the disclosure, the processor 602 may be a Central Processing Unit (CPU) or an Application-Specific Integrated Circuit (ASIC), or may be one or more integrated circuits for controlling the program execution, or may be a baseband chip, etc. There may be one or more memories, and the memory may be a Read Only Memory (ROM), a Random Access Memory (RAM) or a magnetic disk memory, etc.

In a possible design, the first preset condition is the preset signal quality, a preset elevation angle, a preset frequency shift value, or a preset distance.

Figure 7:
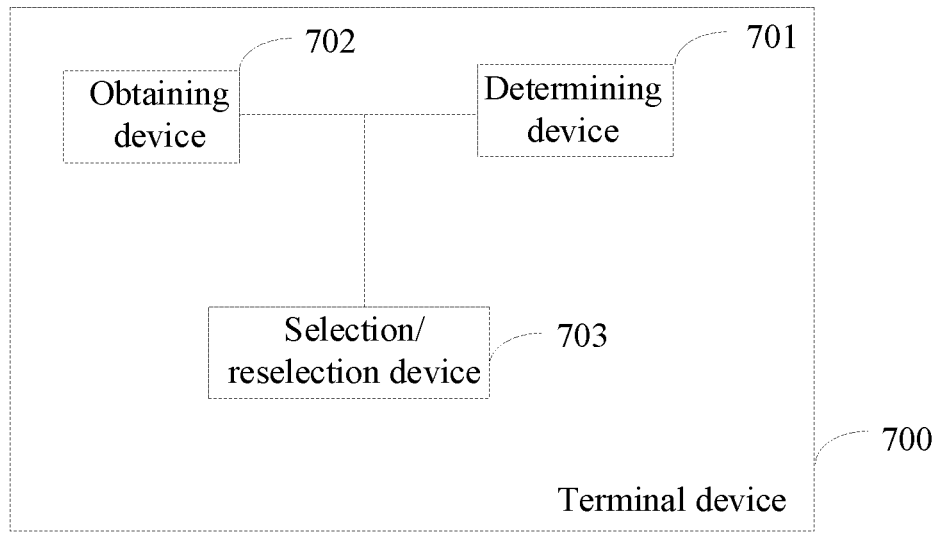
FIG. 7 is a structural schematic diagram of another terminal device provided by an embodiment of the disclosure.

Referring to FIG. 7, another terminal device 700 provided by an embodiment of the disclosure includes:

a determining device 701 configured to determine candidate measurement frequencies according to the geographical location information of one or more satellites in a service are where the terminal device is located, the satellite orbit information, and a correspondence between the satellite orbit information and frequency bands used by the one or more satellites; the geographical location information is used to indicate the geographical location coordinates where the terminal device is currently located, and the satellite orbit information includes the orbital data information and/or identification information of the one or more satellites;

an obtaining device 702 configured to measure the candidate measurement frequencies to obtain a measurement result;

a selection or reselection device 703 configured to select or re-select a target cell which meets a first preset condition based on a measurement result meeting the first preset condition in the measurements results.

In a possible design, when measuring the candidate measurement frequencies to obtain a measurement result, the obtaining device 702 is configured to:

perform a cell reselection measurement on the candidate measurement frequencies to obtain the measurement results based on relevant parameters of a cell where the terminal device currently resides or the geographic location coordinates meet a second preset condition.

In a possible design, when performing the cell reselection measurement on the candidate measurement frequencies to obtain the measurement results based on relevant parameters of the cell where the terminal device currently resides or the geographic location coordinates meet the second preset condition, the obtaining device 702 is configured to:
- perform the cell reselection measurement on the candidate measurement frequencies to obtain the measurement results when signal quality of the cell where the terminal device currently resides is less than first preset signal quality; or
- perform the cell reselection measurement on the candidate measurement frequencies to obtain the measurement results when an elevation angle of a beam corresponding to a signal of the cell is less than a preset elevation angle; or
- perform the cell reselection measurement on the candidate measurement frequencies to obtain the measurement results when a Doppler shift of a beam corresponding to a signal of the cell is greater than a preset frequency shift value; or
- perform the cell reselection measurement on the candidate measurement frequencies to obtain the measurement results when a vertical distance between the geographic location coordinates and a boundary of a cell corresponding to any one of the candidate measurement frequencies is less than a preset distance;
- the first preset signal quality, the preset elevation angle, the preset frequency shift value and/or the preset distance is/are pre-configured in the terminal device or broadcast by a network device to the terminal device through the system information.

In a possible design, when re-selecting a target cell which meets a first preset condition based on a measurement result meeting the first preset condition in the measurement results, the reselection device 703 is configured to:
- when a target cell with signal quality greater than second preset signal quality belongs to cells corresponding to the candidate measurement frequencies, control the terminal device to re-select the target cell; or
- when a target cell of which signal quality is greater than third preset signal quality belongs to cells corresponding to the candidate measurement frequencies, and a duration for which the signal quality of the target cell is greater than the third preset signal quality is maintained for a first preset time length, control the terminal device to re-select the target cell; or
- when signal quality of a cell where the terminal device currently resides is less than fourth preset signal quality and a target cell with signal quality greater than fifth preset signal quality belongs to cells corresponding to the candidate measurement frequencies, control the terminal device to re-select the target cell; or
- when signal quality of a cell where the terminal device currently resides is less than sixth preset signal quality and there is a target cell of which signal quality is greater than seventh preset signal quality belongs to cells corresponding to the candidate measurement frequencies, and a duration for which the signal quality of the target cell is greater than the seventh preset signal quality is maintained for a second preset time length, control the terminal device to re-select the target cell; or
- when there is a target cell having an overlapping coverage area with a cell where the terminal device currently resides among cells corresponding to the candidate measurement frequencies, control the terminal device to re-select the target cell; or
- when there is a target cell having an overlapping coverage area with a cell where the terminal device currently resides among cells corresponding to the candidate measurement frequencies, signal quality of the target cell is greater than eighth preset signal quality and a duration for which the signal quality of the target cell is greater than the seventh preset signal quality is maintained for a third preset time length, control the terminal device to re-select the target cell; or
- when a target candidate measurement frequency point corresponding to more than one cell belongs to the candidate measurement frequencies, control the terminal device to re-select a target cell with longest service time of the target candidate measurement frequency point;
- the second preset signal quality, the third preset signal quality, the fourth preset signal quality, the fifth preset signal quality, the sixth preset signal quality, the seventh preset signal quality, the eighth preset signal quality, the first preset time length, the second preset time length and/or the third preset time length are pre-configured in the terminal device or broadcast by a network device to the terminal device through system information.

In a possible design, when selecting a target cell which meets a first preset condition based on a measurement result meeting the first preset condition in the measurement results, the selection device 703 is configured to:
- when a target cell with signal quality meeting the S criterion belongs to cells corresponding to the candidate measurement frequencies, select the target cell.

In a possible design, when measuring the candidate measurement frequencies to obtain measurement results, the obtaining device 702 is configured to:
- measure the candidate measurement frequencies continuously to obtain the measurement results; or
- measure the candidate measurement frequencies in a preset period to obtain the measurement results;
- the preset period is pre-configured in the terminal device or broadcast by a network device to the terminal device through the system information.

Figure 8:
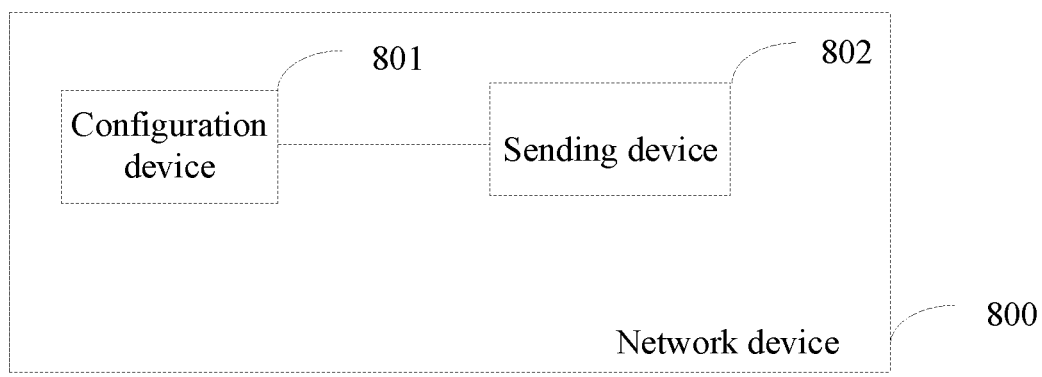
FIG. 8 is a structural schematic diagram of another network device provided by an embodiment of the disclosure.

Referring to FIG. 8, another network device 800 provided by an embodiment of the disclosure includes:
- a configuration device 801 configured to configure a first preset condition for a terminal device;
- a sending device 802 configured to send the first preset condition to the terminal device, so that the terminal device measures candidate measurement frequencies to obtain measurement results after determining the candidate measurement frequencies according to geographical location information, satellite orbit information of one or more satellites in a service area where the terminal device is located and a correspondence between the satellite orbit information and frequency bands used by the one or more satellites, and selects or re-selects a target cell which meets the first preset condition based on a measurement result meeting the first preset condition in the measurement results; and
- the geographical location information is for indicating geographical location coordinates where the terminal device is currently located, and the satellite orbit information includes orbital data information and/or identification information of the one or more satellites.

In a possible design, the first preset condition is the preset signal quality, a preset elevation angle, a preset frequency shift value, or a preset distance.

In a seventh aspect, the disclosure provides a computer storage medium. The storage medium may include a memory that may store a program. When the program is executed, it includes all the steps performed by the terminal device and the network device as recorded in the above method embodiments shown in FIG. 2.

The embodiments of the disclosure can be provided as methods, systems and computer program products. Thus the disclosure can take the form of hardware embodiments alone, software embodiments alone, or embodiments combining the software and hardware aspects. Also the disclosure can take the form of computer program products implemented on one or more computer usable storage mediums (including but not limited to magnetic disk memories, CD-ROMs, optical memories and the like) containing computer usable program codes therein.

The disclosure is described by reference to the flow charts and/or the block diagrams of the methods, the devices (systems) and the computer program products according to the embodiments of the disclosure. It should be understood that each process and/or block in the flow charts and/or the block diagrams, and a combination of processes and/or blocks in the flow charts and/or the block diagrams can be implemented by the computer program instructions. These computer program instructions can be provided to a general-purpose computer, a dedicated computer, an embedded processor, or a processor of another programmable data processing device to produce a machine, so that an apparatus for implementing the functions specified in one or more processes of the flow charts and/or one or more blocks of the block diagrams is produced by the instructions executed by the computer or the processor of another programmable data processing device.

These computer program instructions can also be stored in a computer readable memory which guides the computer or another programmable data processing device to operate in a particular way, so that the instructions stored in the computer readable memory produce a manufacture including the instruction apparatus which implements the functions specified in one or more processes of the flow charts and/or one or more blocks of the block diagrams.

These computer program instructions can also be loaded onto the computer or another programmable data processing device, so that a series of operation steps are performed on the computer or another programmable device to produce the computer-implemented processing. Thus the instructions executed on the computer or another programmable device provide steps for implementing the functions specified in one or more processes of the flow charts and/or one or more blocks of the block diagrams.

What is claimed is:

1. A cell selection method, comprising:
   determining, by a terminal device, candidate measurement frequencies according to geographical location information, satellite orbit information of one or more satellites in a service area where the terminal device is located, and a correspondence between the satellite orbit information and frequency bands used by the one or more satellites; wherein the geographical location information is for indicating geographical location coordinates where the terminal device is currently located, and the satellite orbit information comprises orbital data information and/or identification information of the one or more satellites;
   performing, by the terminal device, a cell measurement on the candidate measurement frequencies to obtain measurement results; and
   selecting or re-selecting, by the terminal device, a target cell which meets a first preset condition based on a measurement result meeting the first preset condition in the measurement results.

2. The method according to claim 1, wherein said performing, by the terminal device, the cell measurement on the candidate measurement frequencies to obtain measurement results comprises:
   performing, by the terminal device, a cell reselection measurement on the candidate measurement frequencies to obtain the measurement results based on that relevant parameters of a cell where the terminal device currently resides or the geographical location coordinates meet a second preset condition.

3. The method according to claim 2, wherein said performing, by the terminal device, the cell reselection measurement on the candidate measurement frequencies to obtain the measurement results based on that relevant parameters of the cell where the terminal device currently resides or the geographical location coordinates meet the second preset condition comprises:
   performing, by the terminal device, the cell reselection measurement on the candidate measurement frequencies to obtain the measurement results when signal quality of the cell where the terminal device currently resides is less than first preset signal quality; or
   performing, by the terminal device, the cell reselection measurement on the candidate measurement frequencies to obtain the measurement results when an elevation angle of a beam corresponding to a signal of the cell is less than a preset elevation angle; or
   performing, by the terminal device, the cell reselection measurement on the candidate measurement frequencies to obtain the measurement results when a Doppler shift of a beam corresponding to a signal of the cell is greater than a preset frequency shift value; or
   performing, by the terminal device, the cell reselection measurement on the candidate measurement frequencies to obtain the measurement results when a vertical distance between the geographical location coordinates and a boundary of a cell corresponding to any one of the candidate measurement frequencies is less than a preset distance;
   wherein the first preset signal quality, the preset elevation angle, the preset frequency shift value and/or the preset distance are pre-configured in the terminal device or broadcast by a network device to the terminal device through system information.

4. The method according to claim 1, wherein said re-selecting, by the terminal device, the target cell which meets the first preset condition based on the measurement result meeting the first preset condition in the measurement results comprises:
   when a target cell with signal quality greater than second preset signal quality belongs to cells corresponding to the candidate measurement frequencies, re-selecting, by the terminal device, the target cell; or
   when a target cell of which signal quality is greater than third preset signal quality belongs to cells corresponding to the candidate measurement frequencies, and a duration for which the signal quality is greater than the third preset signal quality is maintained for a first preset time length, re-selecting, by the terminal device, the target cell; or when signal quality of a cell where the terminal device currently resides is less than fourth preset signal quality and a target cell with signal quality greater than fifth preset signal quality belongs to cells corresponding to the candidate measurement frequencies, re-selecting, by the terminal device, the target cell; or when signal quality of a cell where the terminal device currently resides is less than sixth preset signal quality, a target cell of which signal quality is greater than seventh preset signal quality belongs to cells corresponding to the candidate measurement frequencies, and a duration for which the signal quality of the target cell is greater than the seventh preset signal quality is maintained for a second preset time length, re-selecting, by the terminal device, the target cell; or when there is a target cell having an overlapping coverage area with a cell where the terminal device currently resides among cells corresponding to the candidate measurement frequencies, re-selecting, by the terminal device, the target cell; or when there is a target cell having an overlapping coverage area with a cell where the terminal device currently resides among cells corresponding to the candidate measurement frequencies, signal quality of the target cell is greater than eighth preset signal quality and a duration for which the signal quality of the target cell is greater than the seventh preset signal quality is maintained for a third preset time length, re-selecting, by the terminal device, the target cell; or when a target candidate measurement frequency corresponding to more than one cell belongs to the candidate measurement frequencies, re-selecting, by the terminal device, a target cell with longest service time of the target candidate measurement frequency;

wherein the second preset signal quality, the third preset signal quality, the fourth preset signal quality, the fifth preset signal quality, the sixth preset signal quality, the seventh preset signal quality, the eighth preset signal quality, the first preset time length, the second preset time length and/or the third preset time length are pre-configured in the terminal device or broadcast by a network device to the terminal device through system information.

5. The method according to claim 1, wherein said selecting, by the terminal device, the target cell which meets the first preset condition based on the measurement result meeting the first preset condition in the measurement results comprises:
selecting, by the terminal device, the target cell when there is a target cell with signal quality meeting S criterion among cells corresponding to the candidate measurement frequencies.

6. The method according to claim 1, wherein said performing, by the terminal device, the cell measurement on the candidate measurement frequencies to obtain measurement results comprises:
performing, by the terminal device, a cell measurement on the candidate measurement frequencies continuously to obtain the measurement results; or
performing, by the terminal device, the cell measurement on the candidate measurement frequencies in a preset period to obtain the measurement results;
wherein the preset period is pre-configured in the terminal device or broadcast by a network device to the terminal device through system information.

7. A non-transitory computer storage medium, storing computer executable instructions which are configured to cause a computer to perform the method of claim 1 when running on the computer.

8. A cell selection method, comprising:
configuring, by a network device, a first preset condition for a terminal device;
sending, by the network device, the first preset condition to the terminal device, wherein the terminal device performs a cell measurement on candidate measurement frequencies to obtain measurement results after determining the candidate measurement frequencies according to geographical location information, satellite orbit information of one or more satellites in a service area where the terminal device is located, and a correspondence between the satellite orbit information and frequency bands used by the one or more satellites, and selects or re-selects a target cell which meets the first preset condition based on a measurement result meeting the first preset condition in the measurement results; wherein the geographical location information is for indicating geographical location coordinates where the terminal device is currently located, and the satellite orbit information comprises orbital data information and/or identification information of the one or more satellites.

9. The method according to claim 8, wherein, the first preset condition comprises preset signal quality, a preset elevation angle, a preset frequency shift value, or a preset distance.

10. A terminal device, comprising:
a memory configured to store instructions;
a processor configured to read the instructions stored in the memory to perform the process of:
determining candidate measurement frequencies according to geographical location information, satellite orbit information of one or more satellites in a service area where the terminal device is located, and a correspondence between the satellite orbit information and frequency bands used by the one or more satellites; wherein the geographical location information is for indicating geographical location coordinates where the terminal device is currently located, and the satellite orbit information comprises orbital data information and/or identification information of the one or more satellites;
performing a cell measurement on the candidate measurement frequencies to obtain measurement results; and
controlling the terminal device to select or re-select a target cell which meets a first preset condition based on a measurement result meeting the first preset condition in the measurement results.

11. The terminal device according to claim 10, wherein when performing the cell measurement on the candidate measurement frequencies to obtain the measurement results, the processor is configured to:
perform a cell reselection measurement on the candidate measurement frequencies to obtain the measurement results based on relevant parameters of a cell where the terminal device currently resides or the geographical location coordinates meet a second preset condition.

12. The terminal device according to claim 11, wherein when performing the cell reselection measurement on the candidate measurement frequencies to obtain the measurement results based on the relevant parameters of the cell where the terminal device currently resides or the geographical location coordinates meet the second preset condition, the processor is configured to:
perform the cell reselection measurement on the candidate measurement frequencies to obtain the measurement results when signal quality of the cell where the terminal device currently resides is less than first preset signal quality; or
perform the cell reselection measurement on the candidate measurement frequencies to obtain the measurement results when an elevation angle of a beam corresponding to a signal of the cell is less than a preset elevation angle; or
perform the cell reselection measurement on the candidate measurement frequencies to obtain the measurement results when a Doppler shift of a beam corresponding to a signal of the cell is greater than a preset frequency shift value; or
perform the cell reselection measurement on the candidate measurement frequencies to obtain the measurement results when a vertical distance between the geographical location coordinates and a boundary of a cell corresponding to any one of the candidate measurement frequencies is less than a preset distance;
wherein the first preset signal quality, the preset elevation angle, the preset frequency shift value and/or the preset distance are pre-configured in the terminal device or broadcast by a network device to the terminal device through system information.

13. The terminal device according to claim 10, wherein when controlling the terminal device to re-select a target cell which meets a first preset condition based on a measurement result meeting the first preset condition in the measurement results, the processor is configured to:
when a target cell with signal quality greater than second preset signal quality belongs to cells corresponding to the candidate measurement frequencies, control the terminal device to re-select the target cell; or
when a target cell of which signal quality is greater than third preset signal quality belongs to cells corresponding to the candidate measurement frequencies, and a duration for which the signal quality of the target cell is greater than the third preset signal quality is maintained for a first preset time length, control the terminal device to re-select the target cell; or
when signal quality of a cell where the terminal device currently resides is less than fourth preset signal quality and a target cell with signal quality greater than fifth preset signal quality belongs to cells corresponding to the candidate measurement frequencies, control the terminal device to re-select the target cell; or
when signal quality of a cell where the terminal device currently resides is less than sixth preset signal quality and there is a target cell of which signal quality is greater than seventh preset signal quality belongs to cells corresponding to the candidate measurement frequencies, and a duration for which the signal quality of the target cell is greater than the seventh preset signal quality is maintained for a second preset time length, control the terminal device to re-select the target cell; or
when there is a target cell having an overlapping coverage area with a cell where the terminal device currently resides among cells corresponding to the candidate measurement frequencies, control the terminal device to re-select the target cell; or
when there is a target cell having an overlapping coverage area with a cell where the terminal device currently resides among cells corresponding to the candidate measurement frequencies, signal quality of the target cell is greater than eighth preset signal quality and a duration for which the signal quality of the target cell is greater than the seventh preset signal quality is maintained for a third preset time length, control the terminal device to re-select the target cell; or
when a target candidate measurement frequency point corresponding to more than one cell belongs to the candidate measurement frequencies, control the terminal device to re-select a target cell with longest service time of the target candidate measurement frequency point;
wherein the second preset signal quality, the third preset signal quality, the fourth preset signal quality, the fifth preset signal quality, the sixth preset signal quality, the seventh preset signal quality, the eighth preset signal quality, the first preset time length, the second preset time length and/or the third preset time length are pre-configured in the terminal device or broadcast by a network device to the terminal device through system information.

14. The terminal device according to claim 10, wherein when controlling the terminal device to select the target cell which meets a first preset condition based on a measurement result meeting the first preset condition in the measurement results, the processor is configured to:
control the terminal device to select the target cell when a target cell with signal quality meeting S criterion belongs to cells corresponding to the candidate measurement frequencies.

15. The terminal device according to claim 10, wherein when performing the cell measurement on the candidate measurement frequencies to obtain measurement results, the processor is configured to:
perform the cell measurement on the candidate measurement frequencies continuously to obtain the measurement results; or
perform the cell measurement on the candidate measurement frequencies in a preset period to obtain the measurement results;
wherein the preset period is pre-configured in the terminal device or broadcast by a network device to the terminal device through system information.

* * * * *